US012731294B2

(12) United States Patent
Patel et al.

(10) Patent No.: US 12,731,294 B2
(45) Date of Patent: Sep. 8, 2026

(54) PRE-CONDITIONING OF BLOCK-BASED COMPRESSION BLOCKS FOR LOSSLESS CODECS

(71) Applicant: ADVANCED MICRO DEVICES, INC., Santa Clara, CA (US)

(72) Inventors: Navin Patel, Wesley Chapel, FL (US); Shashank Ranjan, Brookline, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 241 days.

(21) Appl. No.: 18/386,655

(22) Filed: Nov. 3, 2023

(65) Prior Publication Data

US 2025/0148645 A1 May 8, 2025

(51) Int. Cl.
*G06K 9/36* (2006.01)
*G06T 9/00* (2006.01)

(52) U.S. Cl.
CPC .................................... *G06T 9/00* (2013.01)

(58) Field of Classification Search
CPC ......... G06T 9/00; G06T 11/001; G06T 13/00; G06T 15/00; G06T 15/04; G06T 15/08; H04N 19/176; H04N 19/186; H04N 19/436; H04N 19/593; H04N 19/85; H04N 2201/3228; G09G 2340/00; G09G 2340/02
See application file for complete search history.

(56) References Cited

U.S. PATENT DOCUMENTS

2015/0379684 A1* 12/2015 Ramani .................. G06T 11/40 345/531
2023/0245420 A1* 8/2023 Yuan ........................ G06T 9/00 382/108

* cited by examiner

*Primary Examiner* — Duy M Dang

(57) ABSTRACT

A processing system preconditions block-compressed texture blocks by separately streaming color components and index components for lossless compression. The processing system preconditions the color components for linear compression, such that color component data for adjacent compressed blocks in a row are further compressed using lossless compression. Lossless compression is performed for color components spanning multiple rows to leverage patterns in color components that extend vertically across a frame. The processing system further divides input color component and index component data into pages of memory (e.g., 64 kB pages), such that each page can be independently losslessly compressed and decompressed. The processing system applies delta encoding to color component data so that a single instance of color data and differences from the stored color data are stored for each page.

20 Claims, 8 Drawing Sheets

PRE-CONDITIONING OF BLOCK-BASED COMPRESSION BLOCKS FOR LOSSLESS CODECS

BACKGROUND

Block compression is a technique used to reduce the amount of memory used to store color data in a texture. A texture is a one-, two- or multi-dimensional array of data items used in the calculation of the color or appearance of fragments produced by rasterization of a computer graphics scene. A texture could be image data (either photographic or computer generated), color or transparency data, roughness/smoothness data, reflectivity data, etc. Providing realistic computer graphics for applications such as video games typically requires many high quality, detailed textures. Providing such textures can tax available computer memory and bandwidth. Texture compression such as block compression is therefore applied to significantly reduce memory and bandwidth requirements while retaining as much of the quality of the original texture as possible.

Compressing game assets such as textures saves memory space and improves loading times when needed during video game play. Such compression typically falls into two categories: lossy compression and lossless compression. Lossy compression reduces the amount of data stored and transmitted by discarding information that is considered less important or undetectable to the human eye, whereas lossless compression allows the original data to be reconstructed from the compressed data without any loss of information.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
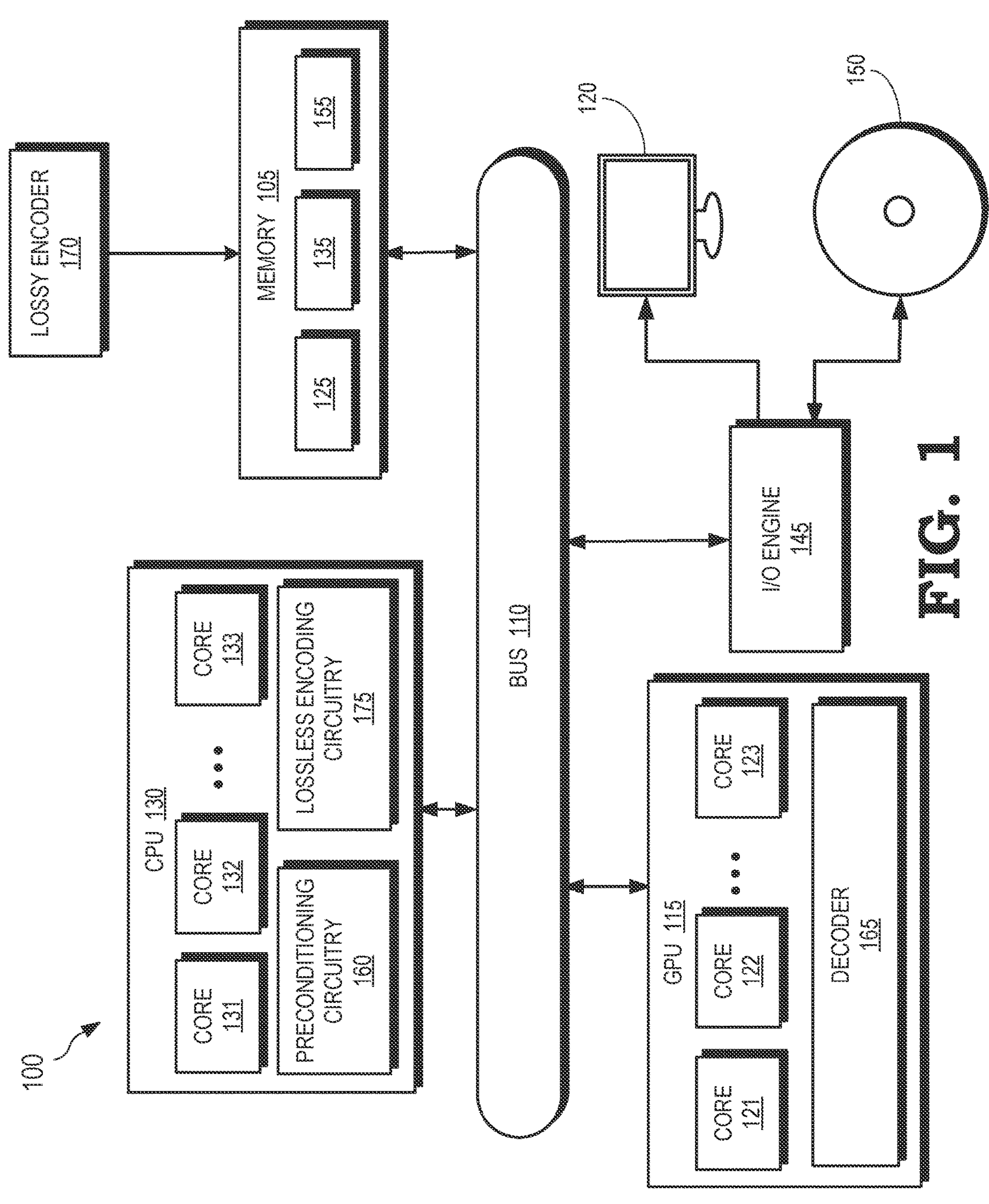
FIG. 1 is a block diagram of a processing system that preconditions compressed texture blocks by separately streaming color components and index components of the compressed texture blocks for lossless compression in accordance with some implementations.

Various texture compression formats have been developed, including a set of seven standard formats called BC1 through BC7. These formats are widely used in, for example, realistic 3D games to reduce memory use (storage and bandwidth) of texture maps. Such applications require high resolution graphics, which require a greater number of textures such as diffuse color, normal map, specular highlight, gloss, emissive glow, and others. To achieve the expected visual detail, vast amounts of data must be provided to processors, which requires very high memory bandwidth. Texture compression reduces the memory bandwidth that would otherwise be required to provide image data to shader cores.

The texture compression enabled by all the BCn formats is based on block compression, and more specifically, 4×4 blocks of pixels. Each image to be processed is divided into these blocks, which are fixed in size to either 8 or 16 bytes, depending on the format. This standard layout and the contiguous storage of blocks in memory permits efficient GPU rendering as the GPU can quickly locate and access any block containing any part of a texture.

Each block represents a small area of the overall image (e.g., a 16-pixel block of 4×4 pixels). In many images, very limited color variation exists within a specific area (or block). Generally, blocks contain shades of a single color or a gradient between two colors. The BCn formats exploit this fact by separating the definition of the colors in a block from their spatial distribution. Thus, rather than storing, e.g., a 1-byte color component for each pixel of a 16-pixel block (which would require 16 bytes), BCn block compression techniques compress 4×4 blocks of pixels into a single (smaller) data packet. Generally, this involves selecting two or more (depending on the BC compression type) "endpoint" colors of, e.g., 1 byte each, with some information per-pixel (referred to as an index) about how to blend between those two colors at each pixel. For example, the BC4 compression format stores two colors and 16 3-bit indices that are used to interpolate the original colors in the texture for each pixel in the block. In this way, the uncompressed 16-byte color information for the block is compressed to 8 bytes (2 bytes for color information and 16×3 bits=48 bits=6 bytes for index information).

The different BC types mostly differ in how many texture channels they have. For example, some BCn formats include compression of an alpha channel of an RGBA (red, green, blue, alpha) input pixel block that represents the transparency/opacity for a color. Whereas an uncompressed RGBA 4×4 pixel block requires 64 Bytes of data, a compressed texture block using BCn achieves a compression ratio of up to 8:1. BC6 and BC7 employ the concept of modes that decide the interpretation of each block. For the other BC modes all blocks are encoded the same way, with the same number of bits allocated for endpoint colors and blend values. With BC6/7 different modes allocate their bits differently on a per-block basis which allows the compressor to make different quality trade-offs in different regions of a texture. Table 1 below illustrates the memory requirements and stored information for each of the BCn compression formats.

TABLE 1

| BC format | Memory | Color/alpha | Indices |
|---|---|---|---|
| BC1 | 8 bytes | Color0, color1 | 16 indices |
| BC2 | 16 bytes | 16 alpha values color0, color1 | 16 indices |
| BC3 | 16 bytes | Alpha0, alpha1 color0, color1 | 16 indices |
| BC4 | 8 bytes | Red0, red1 | 16 indices |
| BC5 | 16 bytes | Green0, green1 | 16 indices |
| BC6 | 16 bytes | Color0, color1 mode dependent | Up to 3 sets of indices |
| BC7 | 16 bytes | Color0, color1 mode dependent | Up to 3 sets of indices |

BCn compression therefore reduces a 4×4 texture with 16 RGBA pixel values having a total of 64 Bytes to either 8 Bytes (in the case of BC1 and BC4) or 16 Bytes (in the case of BC2, BC3, BC5, BC6, and BC7). Once the texture files are saved, they can be further compressed using lossless compression such as a zip format using various types of encoding such as Lempel-Ziv (LZ) and Huffman encoding. LZ encoding algorithms achieve compression by replacing repeated occurrences of data with references to a single copy of the data existing earlier in the uncompressed data stream or by compressing sequential data by building a dictionary of token sequences from an input and then replacing subsequent occurrences of the sequence in the uncompressed data stream with a reference to the dictionary entry. Huffman encoding creates a binary tree of nodes containing a symbol, a weight of a symbol, and optionally, a link to a parent node, traverses the tree to generate a dictionary mapping the symbols to binary codes, and concatenating labels on the edges along the path from a root node to the symbol. However, additional lossless compression does not typically achieve significantly higher compression than the lossy BCn compression that was previously applied.

To facilitate higher compression in lossless formats, FIGS. 1-7 illustrate a processing system that preconditions block-compressed texture blocks by separately streaming color components and index components for lossless compression. Because lossless compression algorithms such as LZ and Huffman are based on recurring patterns, separating the color components of a sequence of block-compressed texture blocks from the corresponding index components of the sequence enables further lossless compression based on patterns in the color components.

In some implementations, the processing system preconditions the color components for linear compression, such that color component data for adjacent compressed blocks in a row are further compressed using lossless compression. For example, in some implementations, color component data for M rows of blocks (e.g., the two color endpoints for the blocks) having a width Nis stored at a first row of memory as color01, color02, color03, . . . , color 0N, at a second row of memory as color11, color12, color13, . . . , color1N, and so on to the Mth row as colorM1, colorM2, colorM3, . . . , colorMN, and lossless compression is performed for color components of adjacent blocks in a row. In other implementations, lossless compression is performed for color components spanning multiple rows to leverage patterns in color components that extend vertically across a frame. In such "tiled" implementations, the processing system groups together color component data for sets of neighboring blocks that are stored across multiple rows. For example, in some implementations, the processing system groups together color component data from X adjacent blocks in Y adjacent rows for lossless compression.

The processing system further divides input color component and index component data into pages of memory (e.g., 64 kB pages) in some implementations, such that each page can be independently losslessly compressed and decompressed. In some such implementations, the processing system applies delta encoding to color component data so that a single instance of color data and differences from the stored color data are stored for each page.

The processing system provides fields in a header of the streams of color component and index component data to indicate usage of block compression-based data preconditioning. For example, in some implementations, a flag in the header indicates whether data was preconditioned before lossless compression was applied. In some implementations, a field in a compressed page header indicates whether and what types of preconditioning operations were applied to the page. A decoder reads the compressed stream header and the page header to perform post-conditioning for decompression to recover the original format of the data.

FIG. 1 is a block diagram of a processing system 100 that preconditions compressed texture blocks by separately streaming color components and index components of the compressed texture blocks for lossless compression in accordance with some implementations. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some implementations of the processing system 100 include other buses, bridges, switches, routers, and the like, which are not shown in FIG. 1 in the interest of clarity.

The processing system 100 also includes one or more parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like. In some implementations of the processing system 100, the parallel processor is implemented as a graphics processing unit (GPU) 115 that renders images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that execute instructions concurrently or in parallel. The number of processor cores 121-123 implemented in the GPU 115 is a matter of design choice and some implementations of the GPU 115 include more or fewer processor cores than shown in FIG. 1. Some implementations of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some implementations include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some implementations of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated implementation, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The cores 121-123 in the GPU 115 perform operations using texture data 155 stored in the memory 105. The texture data 155 includes information that represents a set of pixels. In some implementations, the cores 121-123 or the GPU 115 implement caches to cache portions of the texture data 155 that are frequently used by one or more of the cores 121-123.

In some implementations, the CPU 130 and/or the GPU 115 include portions of a codec that compresses and/or decompresses texture and other image data. In the illustrated example, the CPU 130 includes a preconditioner including preconditioning circuitry 160 and a lossless encoding circuitry 175. A lossy encoder 170, which is external to the processing system 100 in the illustrated example, applies block-based compression such as BCn compression to the texture data to form block-compressed texture data stored at the memory 105 as texture data 155 in the form of blocks, referred to herein as compressed texture blocks. Each compressed texture block includes both color component and index component information for a block of pixels of a frame that has been compressed using a lossy block compression algorithm such as a BCn compression format.

The preconditioning circuitry 160 accesses the compressed texture blocks and divides each compressed texture block into two segments: one segment includes the color component(s) and the other segment includes the index components. The preconditioning circuitry 160 separately transmits the color components and the index components in streams to the lossless encoding circuitry 175 for lossless compression. For example, in some implementations, the preconditioning circuitry streams the color components for compressed texture blocks of an image frame from left to right and from top to bottom into a block of memory and separately streams the corresponding index components for the compressed texture blocks of the image frame from left to right and from top to bottom into a separate block of memory.

In some implementations, the preconditioning circuitry 160 groups color components and index components for adjacent compressed texture blocks into tiles to enhance compressibility of the compressed texture blocks by the lossless compressor. Such tiling takes advantage of patterns of color component data that span multiple rows of compressed texture blocks, allowing the lossless encoding circuitry 175 to achieve a higher compression ratio than what is attainable when the compressed texture blocks are individually losslessly compressed. The preconditioning circuitry 160 indicates the groupings in a stream header for each of the color component and index component streams in some implementations. For example, the stream header indicates an offset (starting point), width (number of blocks horizontally), height (number of blocks vertically), and stride for each grouping of color components and each grouping of index components that are to be collectively compressed as a group by the lossless encoding circuitry 175.

In some implementations, the preconditioning circuitry 160 divides the color components and the index components into pages of memory. The preconditioning circuitry 160 (or, in some implementations, the lossless encoding circuitry 175) determines whether each page of memory includes color component data. If a page of memory includes color component data, the lossless encoding circuitry 175 applies delta encoding to the page of memory to further compress the color component data into differences between color component data among the constituent blocks of the page of memory.

In some implementations, the decoder 165 is implemented in the CPU 130. In other implementations, such as the implementation illustrated in FIG. 1, the GPU 115 includes a decoder 165 that receives and decompresses the preconditioned and losslessly encoded pages of memory. For some implementations in which the decoder 165 is implemented in the GPU 115 or another parallel processing device, the lossless encoding circuitry 175 rearranges the bytes of compressed texture data stored within the pages of memory into multiple bitstreams (e.g., 32 bitstreams) for parallel processing across threads at the decoder 165.

Figure 2:
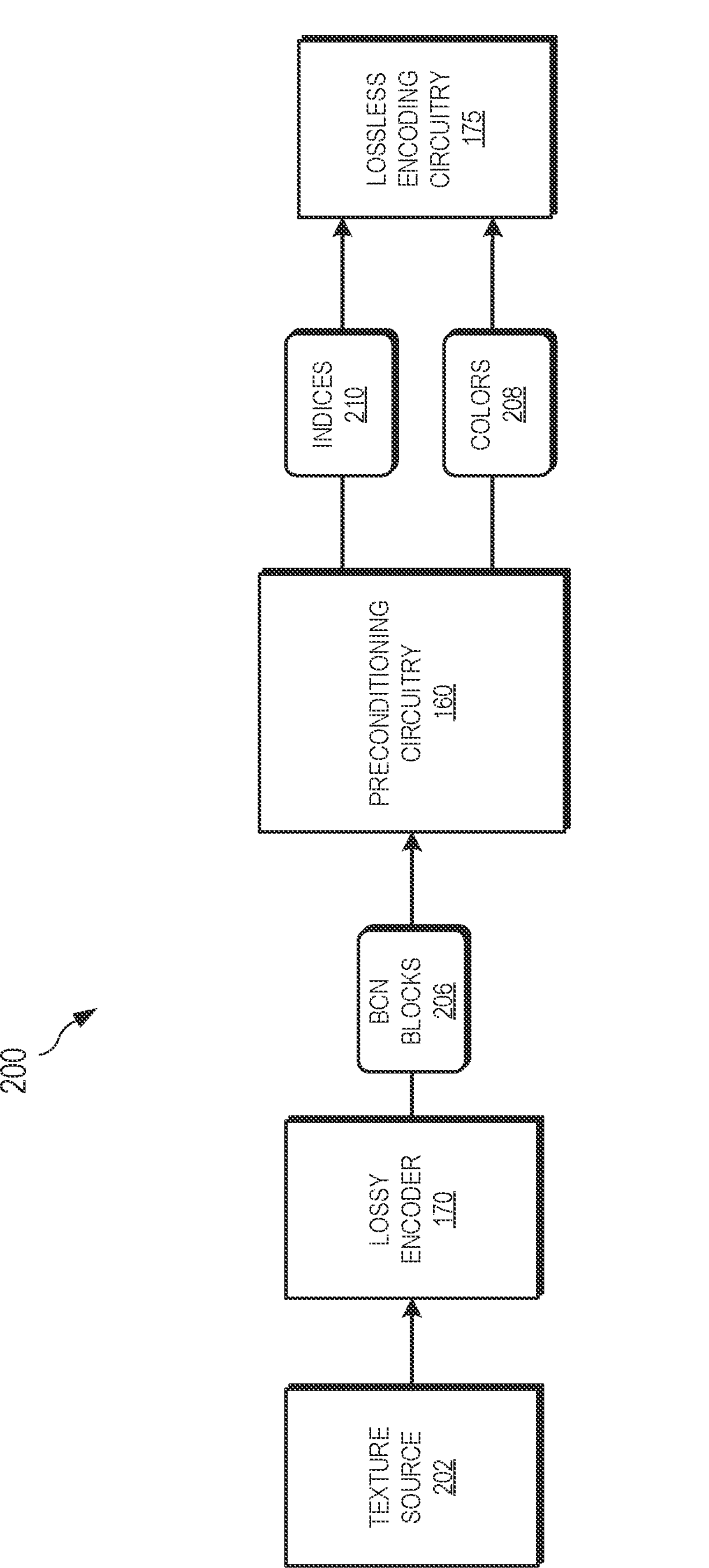
FIG. 2 is a block diagram of preconditioning circuitry dividing block-compressed texture blocks into color components and index components for separate streaming to a lossless encoder in accordance with some implementations.

FIG. 2 is a block diagram 200 of the preconditioning circuitry 160 of FIG. 1 dividing block-compressed texture blocks 206 into color components and index components for separate streaming to the lossless encoding circuitry 175 in accordance with some implementations. In the illustrated example, a texture source 202 transmits uncompressed texture data (not shown) to the lossy encoder 170. In some implementations, the lossy encoder 170 is external to the processing system 100 of FIG. 1, and in other implementations, the lossy encoder is included in a codec of the processing system 100 of FIG. 1.

The lossy encoder 170 applies a block compression algorithm such as BC1 to BC7 to the texture data and transmits the resulting BCn blocks 206, which include color components and index components as described above in Table 1, to the preconditioning circuitry 160 in some implementations. In other implementations, the lossy encoder 170 stores the resulting BCn blocks 206 at a memory (not shown) such as a buffer and the preconditioning circuitry 160 accesses the BCn blocks 206 from the memory.

The preconditioning circuitry 160 divides the BCn blocks 206 into color component segments 208 and corresponding index component segments 210 and streams the color component segments 208 and index component segments 210 separately to the lossless encoding circuitry 175. In some implementations, the lossless encoding circuitry 175 is included in the CPU 130. Thus, rather than providing the BCn blocks 206 in a single stream such as color01, index01, color02, index02, . . . , color0N, index0N, the preconditioning circuitry 160 sends a stream of color component segments 208 such as color01, color02, . . . , color0N and separately send a stream of corresponding index component segments 210 such as index01, index02, . . . , index0N to the lossless encoding circuitry 175. By separating the color component segments 208 from the index component segments 210 and transmitting them in two different streams to the lossless encoding circuitry 175, the preconditioning circuitry 160 preconditions the block-compressed texture data so that the lossless encoding circuitry 175 can leverage patterns in the color components to achieve more effective compression.

Figure 3:
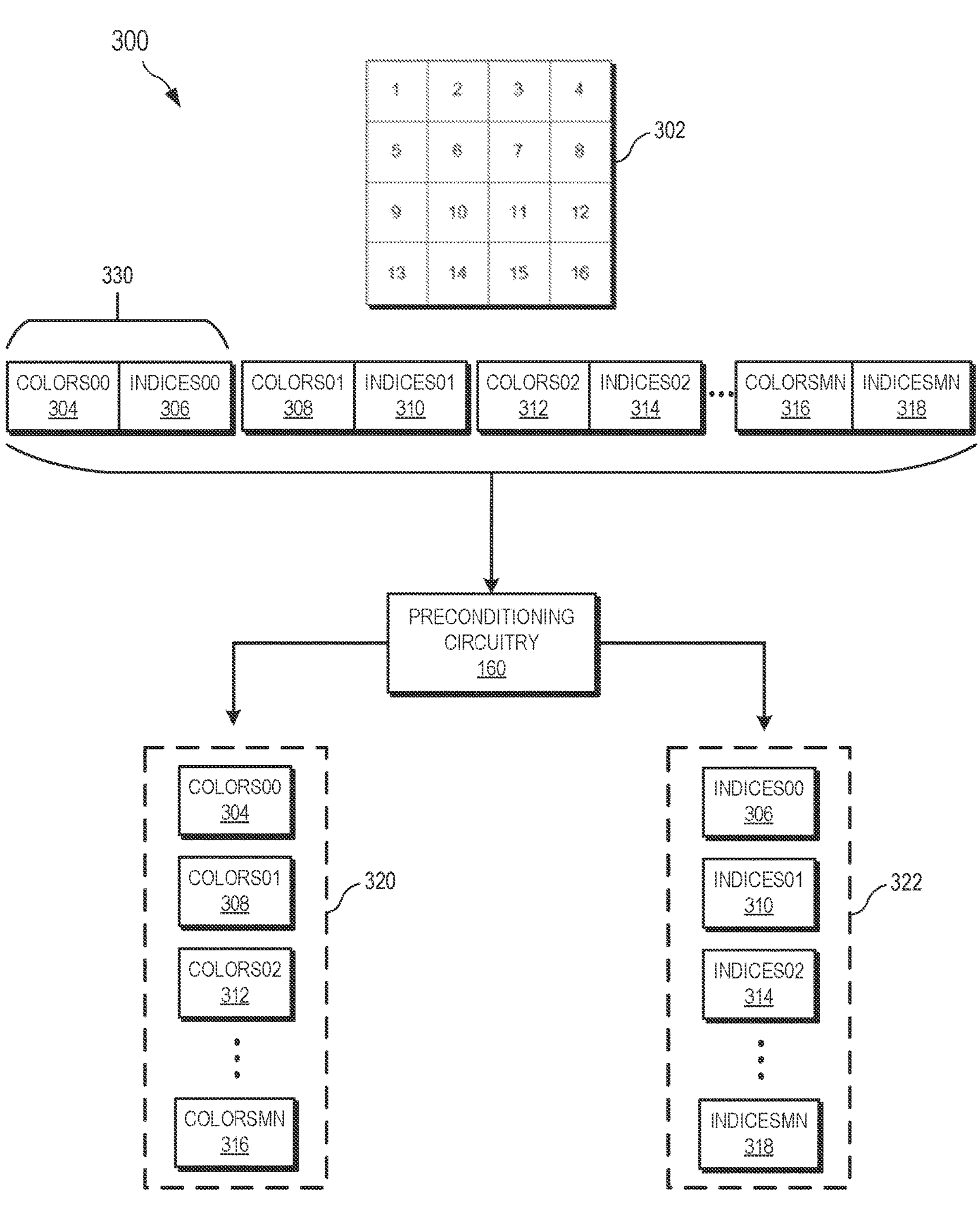
FIG. 3 is a block diagram of color components and index components for block-compressed texture blocks streaming separately for lossless compression in accordance with some implementations.

FIG. 3 is a block diagram 300 of color components and index components for block-compressed texture blocks streaming separately for lossless compression in accordance with some implementations. A lossy encoder such as the lossy encoder 170 of FIG. 1 compresses a series of 16-pixel blocks 302 of a frame including M×N blocks, each of which includes 4×4 pixels, using a BCn compression algorithm. The BCn compression algorithm results in a compressed texture block 330 including a set of colors and indices for each 16-pixel block 302. For example, a first 16-pixel block 302 results in compressed texture block 330, which includes colors00 304 and indices00 306. An adjacent 16-pixel block results in a compressed texture block including colors01 308 and indices01 310, while the next adjacent 16-pixel block results in a compressed texture block including colors02 312 and indices02 314. For a row of pixels that is M blocks wide, the lossy encoder 170 continues producing compressed texture blocks until the last block of the row, which produces a compressed texture block that includes colors0M and indices0M (not shown). Once the end of the row has been reached, the lossy encoder 170 compresses a next row of 16-pixel blocks 302 and continues encoding row after row until the Nth row, which includes colorsN0 and indicesN0 (not shown) through colorsNM 316 and indicesNM 318.

Typically, the compressed texture blocks 330 are sent to the lossless encoding circuitry 175 intact, and the lossless encoding circuitry 175 applies lossless compression techniques such as LZ and/or Huffman encoding to further compress the compressed texture blocks 330. However, little additional compression is generally achieved, as lossless compression algorithms are based on recurring patterns that are not necessarily apparent in the successive compressed texture blocks.

To facilitate additional lossless compression based on recurring patterns that may be present in high levels of localized color components for specific compressed texture block segments, the preconditioning circuitry 160 divides each of the compressed texture blocks 330 into a color component segment and an index component segment. The preconditioning circuitry 160 then collects the color components segments into a color components stream 320 and collects the index components segments into an index components stream 322 so that each stream can be further compressed at, e.g., the lossless encoding circuitry 175.

Thus, in the illustrated example, the color components stream 320 includes colors00 304, colors01 308, colors02 312, . . . , and colorsMN 316. The index components stream includes indices00 306, indices01 310, indices02 314, . . . , and indicesMN 318. By separately sending the color components stream 320 and the index components stream 322, the preconditioning circuitry 160 enables higher compression, saving memory space and bandwidth and improving performance on asset loading times.

Figure 4:
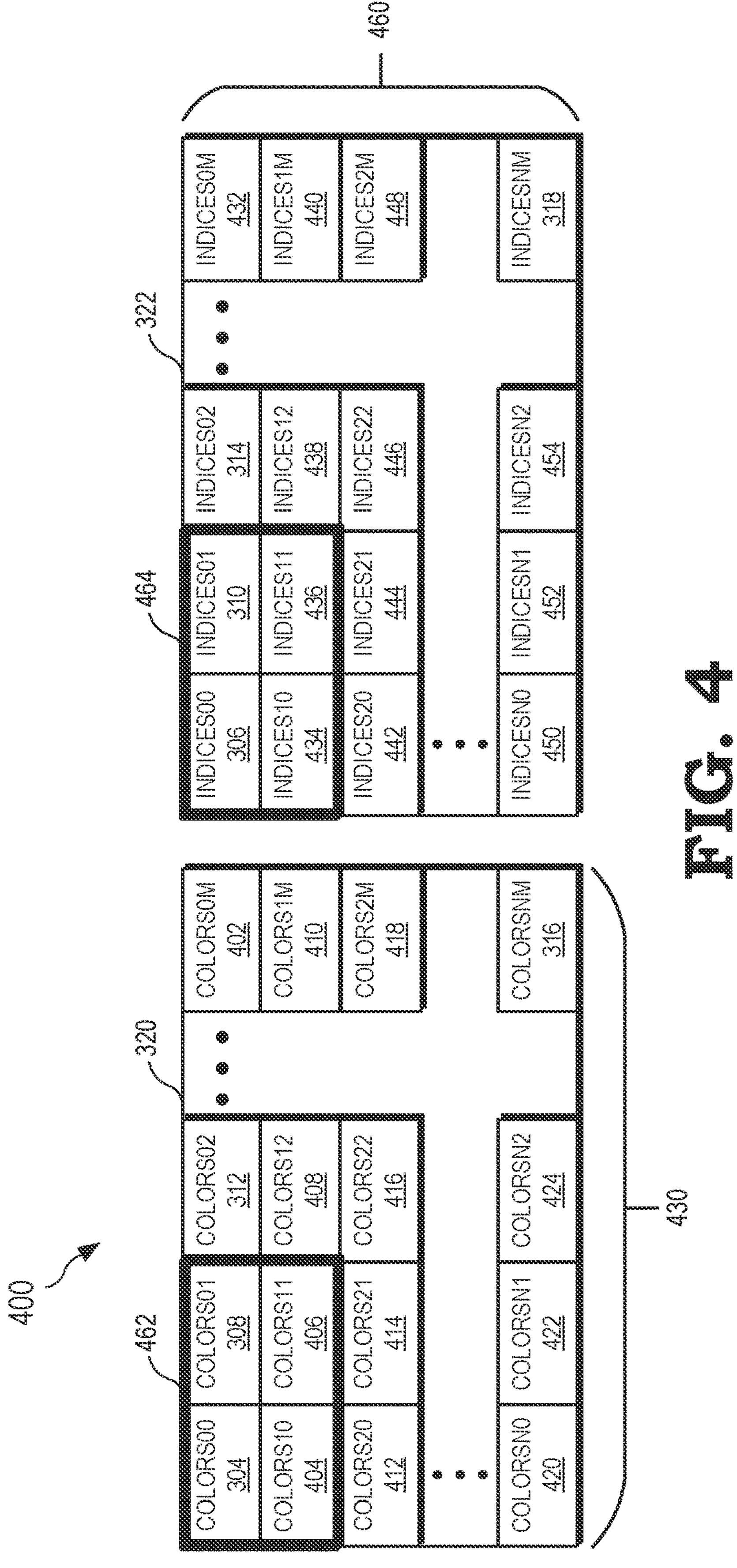
FIG. 4 is a block diagram of groupings of color components and groupings of corresponding index components for lossless compression in accordance with some implementations.

FIG. 4 is a block diagram of groupings of color components and groupings of corresponding index components for lossless compression in accordance with some implementations. To achieve yet higher compression ratios, in some implementations the preconditioning circuitry 160 groups together blocks of color components and corresponding blocks of index components into tiles for compression by the lossless encoding circuitry 175. Such groupings extend across multiple rows of compressed texture blocks, thus leveraging color locality that may exist vertically across portions of a frame.

In the illustrated example, the color components of the color components stream 320 and the corresponding index components of the index components stream 322 are stored in memory in "typewriter order" that proceeds from left to right and top to bottom for a block of memory having a width 430 of M color blocks (or M index blocks) and a height 460 of N color blocks (or N index blocks). Thus, a first row of color components includes colors00 304, colors01 308, colors02 312, . . . , colors0M 402; a second row of color components includes colors10 404, colors11 406, colors12, 408, . . . , colors1M 410; a third row of color components includes colors20 412, colors21 414, colors22 416, . . . , colors2M 418, and so on until the Nth row, which includes colorsN0 420, colorsN1 422, colorsN2 424, . . . , and colorsNM 316. Similarly, a first row of index components includes indices00 306, indices01 310, indices02 314, . . . , indices0M 432; a second row of index components includes indices10 434, indices11 436, indices12 438, . . . , and indices 1M 440; a third row of index components includes indices20 442, indices21 444, indices22 446, . . . , and indices2M 448; and so on until the Nth row, with includes indicesN0 450, indicesN1 452, indicesN2 454, . . . , and indicesNM 318.

The preconditioning circuitry 160 identifies groupings of neighboring color components and corresponding groupings of neighboring index components for the lossless encoding circuitry 175 to compress together as a group. For example, as illustrated in FIG. 4, the preconditioning circuitry 160 identifies a group 462 of neighboring color components including colors00 304, colors01 308, colors10 404, and colors11 406 as a color component tile to be compressed together as a group. The preconditioning circuitry 160 also identifies a group 464 of corresponding neighboring index components including indices00 306, indices01 310, indices10 434, and indices11 436 as an index component tile to be compressed together as a group. Thus, in the illustrated example, the preconditioning circuitry 160 groups a 2×2 block of color components and a corresponding 2×2 block of index components for further compression at the lossless encoding circuitry 175. In other implementations, the preconditioning circuitry 160 groups together different sizes of sets of color components and index components for further compression that can be described by a width (e.g., 3 sets of color/index components in a horizontal direction), height (e.g., 3 sets of color/index components in a vertical direction), and stride (e.g., every fourth color/index component starts a new set).

In some implementations, the preconditioning circuitry 160 separates the beginning endpoint color component (top color reference) from the ending endpoint color component (bottom color reference) for each block. In other words, the preconditioning circuitry 160 divides each color block (e.g., colors00 304) into two color block portions-a portion for the top color reference and a portion for the bottom color reference. The preconditioning circuitry 160 then groups together multiple top color references and, separately, multiple bottom color references, which may have more similarities than a top color reference compared to its corresponding bottom color reference, for further compression by the lossless encoding circuitry 175.

Figure 5:
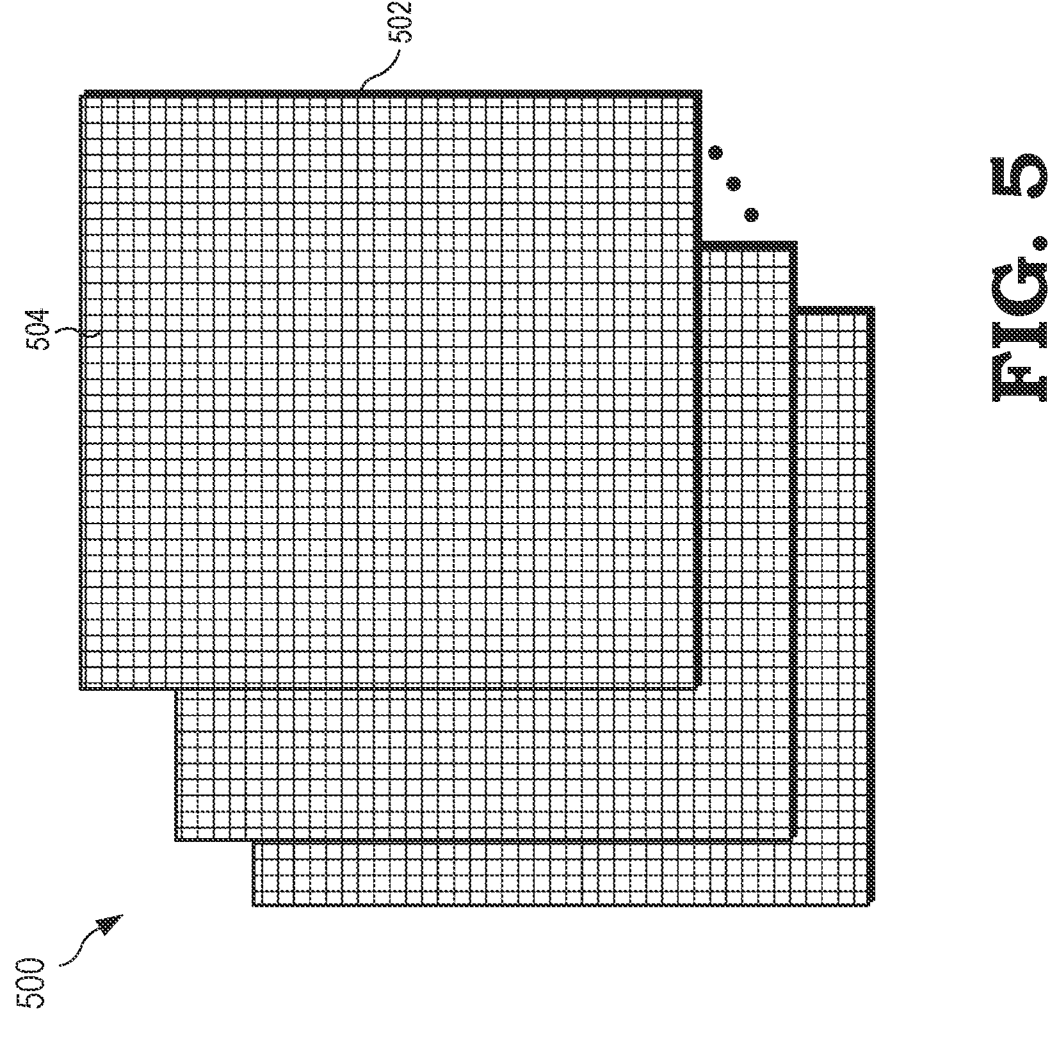
FIG. 5 is a block diagram of groups of color components and index components partitioned into pages of memory for lossless compression in accordance with some implementations.

FIG. 5 is a block diagram 500 of groups of color components and index components partitioned into pages 502 of memory for lossless compression in accordance with some implementations. Each page 502 of memory includes multiple color components and/or index components, one of which is illustrated as color component 504. In some implementations, the preconditioning circuitry 160 partitions the groups of color components and index components into pages 502, and in other implementations, the lossless encoding circuitry 175 partitions the groups of color components and index components into pages 502. Each page is 64 KB in some implementations.

Some pages 502 include only color components and other pages 502 include only index components, while some pages 502 include both color components and index components. Once the color components and index components are divided into pages 502, the lossless encoding circuitry 175 applies a lossless compression algorithm to compress each page separately. The lossless encoding circuitry 175 determines whether a page 502 includes color components or index components (or both). If the page 502 includes color components, in some implementations, the lossless encoding circuitry 175 applies delta encoding to encode the differences between colors from one color component to another within the page 502. Delta encoding thus converts the page 502 of color components into a page of color component differences. Such color component differences may reveal additional patterns within the color component data that lend themselves to further compression by the lossless encoding circuitry 175. For example, in some implementations, the lossless encoding circuitry 175 applies delta encoding to a page 502 including color components and then applies LZ77 compression followed by Huffman encoding to provide a final compressed output.

Figure 6:
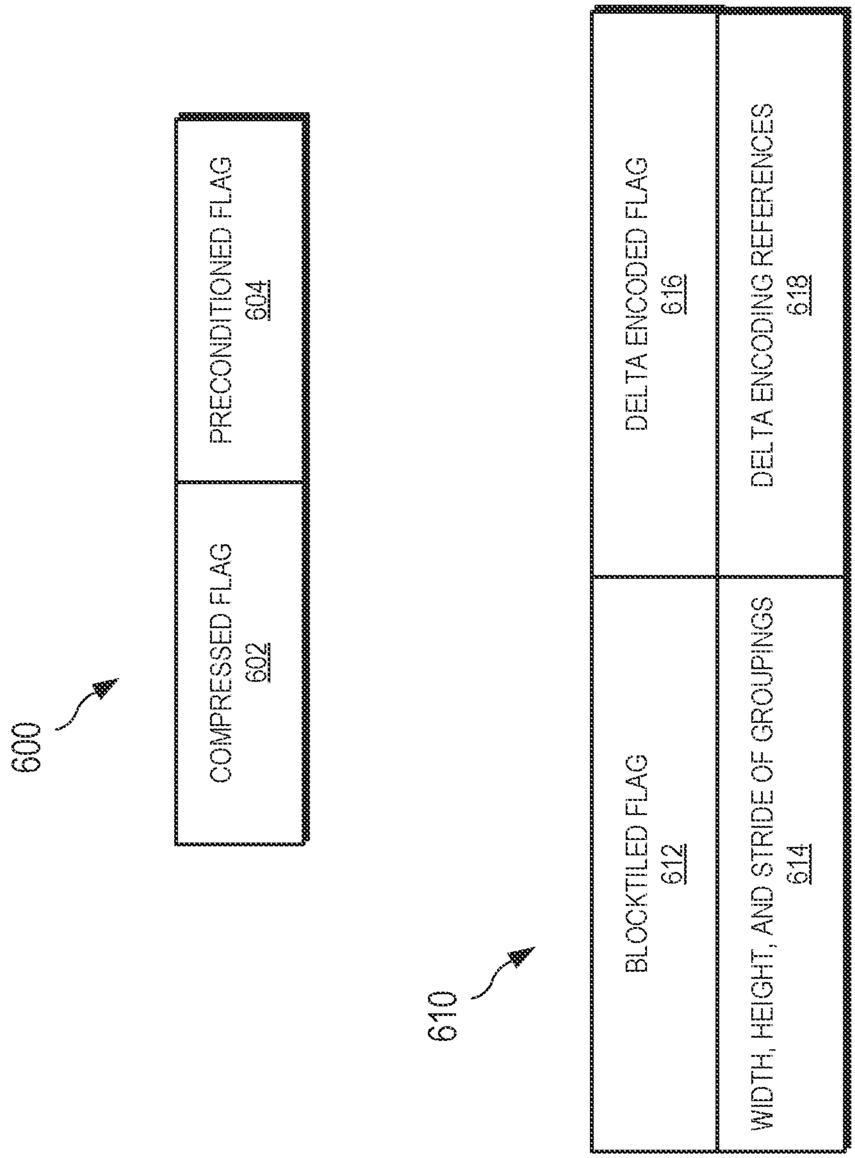
FIG. 6 is a block diagram of a header indicating a width, height, and stride for groupings of color components and groupings of corresponding index components for lossless compression in accordance with some implementations.

FIG. 6 is a block diagram of a stream header 600 including fields for indicating a width, height, and stride for groupings of color components and groupings of corresponding index components for lossless compression in accordance with some implementations. In some implementations, each of the color components stream 320 and the index components stream 322 includes a stream header 600 that indicates preconditioning and compression of the compressed texture blocks 330.

In the illustrated example, the stream header 600 includes a field for a compressed flag 602 that indicates that the texture blocks 330 were compressed. The stream header 600 further includes a field for a preconditioned flag 604 that indicates whether the texture blocks were preconditioned.

If the preconditioned flag 604 is asserted, the stream header 600 includes additional fields 610. For example, in some implementations, the additional fields 610 include fields for a blocktiled flag 612, a width, height, and stride of groupings field 614, a delta encoded flag 616, and a delta encoding references field 618. The blocktiled flag 612 is asserted to indicate that the preconditioning circuitry 160 has identified groupings of neighboring color components and corresponding groupings of neighboring index components for the lossless encoding circuitry 175 to compress together as a group. of adjacent color components and groupings of adjacent index components for further compression by the lossless encoding circuitry 175. The width, height, and stride of groupings field 614 indicates the dimensions and stride of the groupings of adjacent color components and the groupings of adjacent index components.

The delta encoded flag 616 is asserted to indicate that delta encoding has been applied to the color components, and the delta encoding references field 618 includes the color endpoints which the delta encoding uses as references. In some implementations, the additional fields 610 further includes a field (not shown) indicating a number of mip levels present in the stream.

Figure 7:
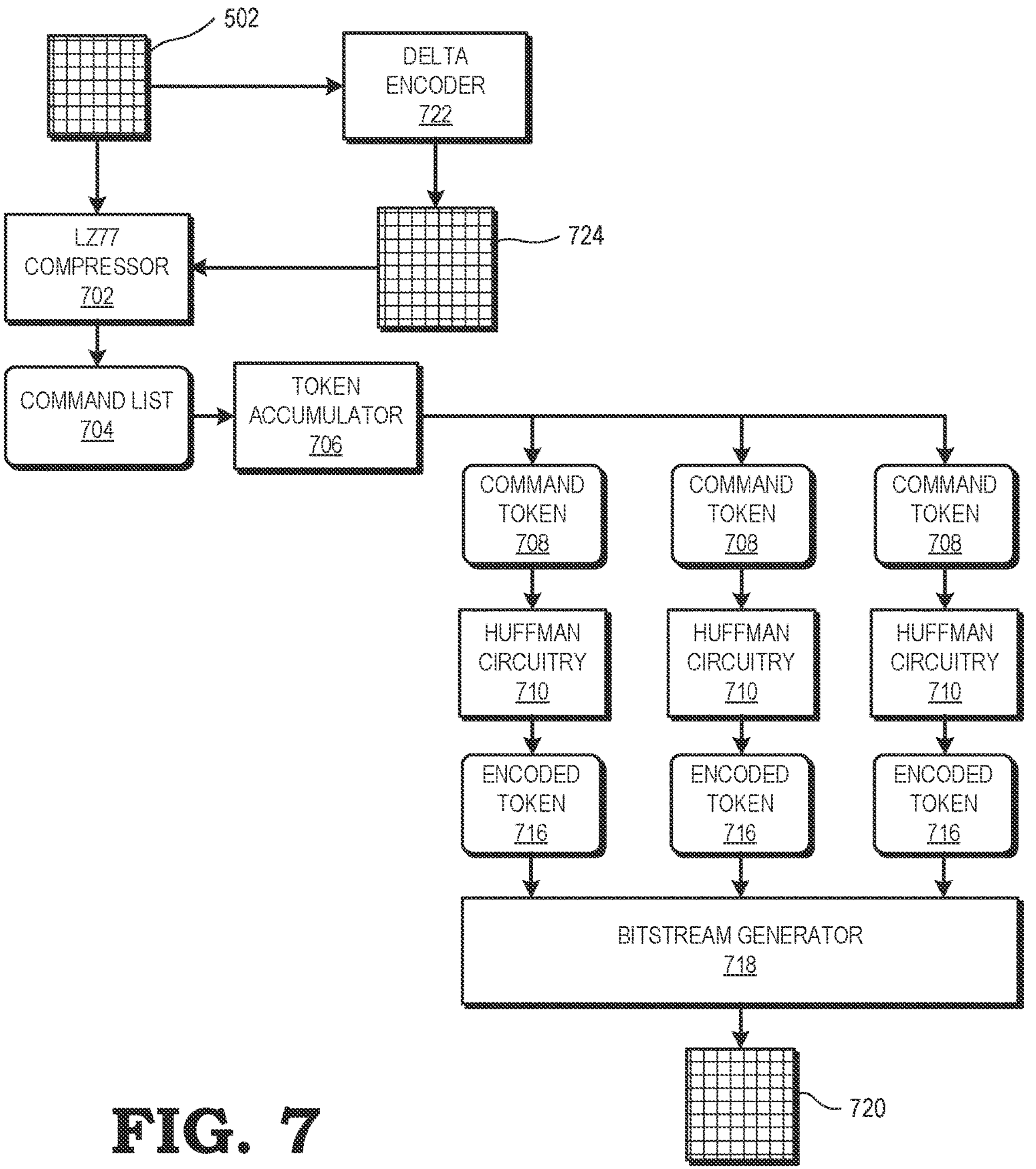
FIG. 7 is a block diagram illustrating lossless encoding circuitry losslessly encoding a compressed page in accordance with some implementations.

FIG. 7 is a block diagram illustrating lossless encoding circuitry 175 losslessly encoding a compressed page such as page 502. In some implementations, the lossless encoding circuitry 175 includes components such as a delta encoder 722, an LZ77 compressor 702, a token accumulator 706, Huffman circuitry 710, and a bitstream generator 718. If the compressed page 502 includes color components that are amenable to delta encoding, the delta encoder 722 delta encodes the compressed page to generate a delta encoded compressed page 724. The LZ77 compressor 702 performs LZ77 compression on the delta encoded compressed page 724 or, in implementations in which the compressed page 502 is not delta encoded, the LZ77 compressor 702 performs LZ77 compression on the compressed page 502.

The LZ77 compressor 702 parses the delta encoded compressed page 724 (or the compressed page 502) to identify any string of bytes that matches a previously encountered string of bytes in the page (referred to as a reference). The LZ77 compressor 702 replaces the subsequent string of bytes with the reference, which is stored as a token. The LZ77 compressor 702 also stores a token representing a copy distance, which is the distance from the subsequent string of bytes to the reference. Bytes that cannot be converted into references are referred to as literals, which are represented by a token and stored without further compression in a command list 704 in a compressed page that is output from the LZ77 compressor 702.

Each command in the command list 704 represents a compressed data segment of the page. In some implementations, each command includes a number of tokens such as an insert-and-copy (IC) length (e.g., the size and number of uncompressed bytes—the insert length—in a data segment of the page), a copy distance (D), and zero or more literals (uncompressed bytes) (L). Thus, a command may include, e.g., |IC0 D0 L0 L1 L2|. In some implementations, the end of a list of commands for a page is marked with a sentinel command |0|. The token accumulator 706 accumulates the tokens (also referred to herein as command tokens) from the command list 704 and distributes the command tokens 708 among a plurality of threads (three of which are shown in the illustrated example). The Huffman circuitry 710 groups the tokens together by type and generates a Huffman table for each type of token (e.g., an IC Huffman table, a D Huffman table, and an L Huffman table). The Huffman circuitry then uses the Huffman tables to encode each token in the command list in order to generate encoded tokens 716.

A decoder that is implemented in a parallel processor such as the GPU 115 is typically capable of running multiple (e.g., 32) parallel threads per compute unit. To facilitate more efficient decompression processing of the encoded tokens at a parallel processor such as the GPU 115, the bitstream generator 718 distributes the encoded tokens across multiple bitstreams. In some implementations, the bitstream generator 718 distributes the encoded tokens across a number of bitstreams corresponding to a number of threads that can be processed in parallel for each compute unit of the decoder of the parallel processor (e.g., 32 bitstreams). For example, Table 2 illustrates an example encoded command list for commands C0 through C7, in which ICnF is an encoded insert-and-copy length, $Dn^E$ is an encoded copy distance, $Ln^E$ is an encoded literal, and SE is an encoded sentinel.

TABLE 2

| | | | | | | | | | | | | |
|---|---|---|---|---|---|---|---|---|---|---|---|---|
| C0 | $IC0^E$ | $D0^E$ | $L0^E$ | $L1^E$ | $L2^E$ | $L3^E$ | $L4^E$ | $L5^E$ | | | | |
| C1 | $IC1^E$ | $D1^E$ | $L6^E$ | $L7^E$ | | | | | | | | |
| C2 | $IC2^E$ | $D2^E$ | | | | | | | | | | |
| C3 | $IC3^E$ | $D3^E$ | $L8^E$ | $L9^E$ | $L10^E$ | | | | | | | |
| C4 | $IC4^E$ | $D4^E$ | $L11^E$ | $L12^E$ | $L13^E$ | $L14^E$ | $L15^E$ | $L16^E$ | $L17^E$ | $L18^E$ | $L19^E$ | |
| C5 | $IC5^E$ | $D5^E$ | $L20^E$ | $L21^E$ | $L22^E$ | | | | | | | |
| C6 | $IC6^E$ | $D6^E$ | $L23^E$ | $L24^E$ | $L25^E$ | $L26^E$ | $L27^E$ | | | | | |
| C7 | $IC7^E$ | $D7^E$ | $L28^E$ | | | | | | | | | |
| $S^E$ | | | | | | | | | | | | |

lossless encoding circuitry 175 without further groupings of the color components and the index components. The lossless encoding circuitry 175 compresses the color components and the index components in order, one after another, from left to right and top to bottom.

The bitstream generator 718 reorders the tokens of the commands into a number of bitstreams for parallel processing at a corresponding number of threads of a decoder such as decoder 165. For example, Table 3 illustrates several bitstreams, each including rearranged tokens from commands C0-C7 as shown above in Table 2. Although only four bitstreams are illustrated in Table 3, in some implementations, the bitstream generator 718 reorders the tokens of the commands across 32 bitstreams for parallel processing at 32 threads per compute unit of the decoder 165.

TABLE 3

| | | | | | | | | | | | | |
|---|---|---|---|---|---|---|---|---|---|---|---|---|
| B0 | $IC0^E$ | $D0^E$ | $L0^E$ | $L4^E$ | $L8^E$ | $IC4^E$ | $D4^E$ | $L11^E$ | $L15^E$ | $L19^E$ | $L23^E$ | $L27^E$ |
| B1 | $IC1^E$ | $D1^E$ | $L1^E$ | $L5^E$ | $L9^E$ | $IC5^E$ | $D5^E$ | $L12^E$ | $L16^E$ | $L20^E$ | $L24^E$ | $L28^E$ |
| B2 | $IC2^E$ | $D2^E$ | $L2^E$ | $L6^E$ | $L10^E$ | $IC6^E$ | $D6^E$ | $L13^E$ | $L17^E$ | $L21^E$ | $L25^E$ | $S^E$ |
| B3 | $IC3^E$ | $D3^E$ | $L3^E$ | $L7^E$ | $IC7^E$ | $D7^E$ | $L14^E$ | $L18^E$ | $L22^E$ | $L26^E$ | | |

If, at block 808, the preconditioning circuitry 160 applies tiled compression, the method flow continues to block 812. At block 812, the preconditioning circuitry 160 groups the color components and corresponding index components into sets that span across multiple rows to be losslessly compressed together as a group. In some implementations, the preconditioning circuitry 160 indicates the groupings in a stream header such as stream header 600, which specifies the width, height, and stride of the groupings. At block 814, the lossless encoding circuitry 175 compresses the identified groups of color components and the corresponding groups of index components.

Whether the color components and the index components are compressed linearly or using a tiled method, the method flow then continues to block 816. At block 816, the preconditioning circuitry 160 (or, in some implementations, the lossless encoding circuitry 175) divides the color components and the index components into pages of memory. At block 818, the lossless encoding circuitry 175 determines whether a page of memory includes color components and, if so, the lossless encoding circuitry 175 applies delta encoding to further compress the texture and to identify additional patterns in the color differences between texture blocks that are amenable to further compression. In some implementations, the lossless encoding circuitry 175 applies LZ compression and/or Huffman encoding to further compress the texture data.

Figure 8:
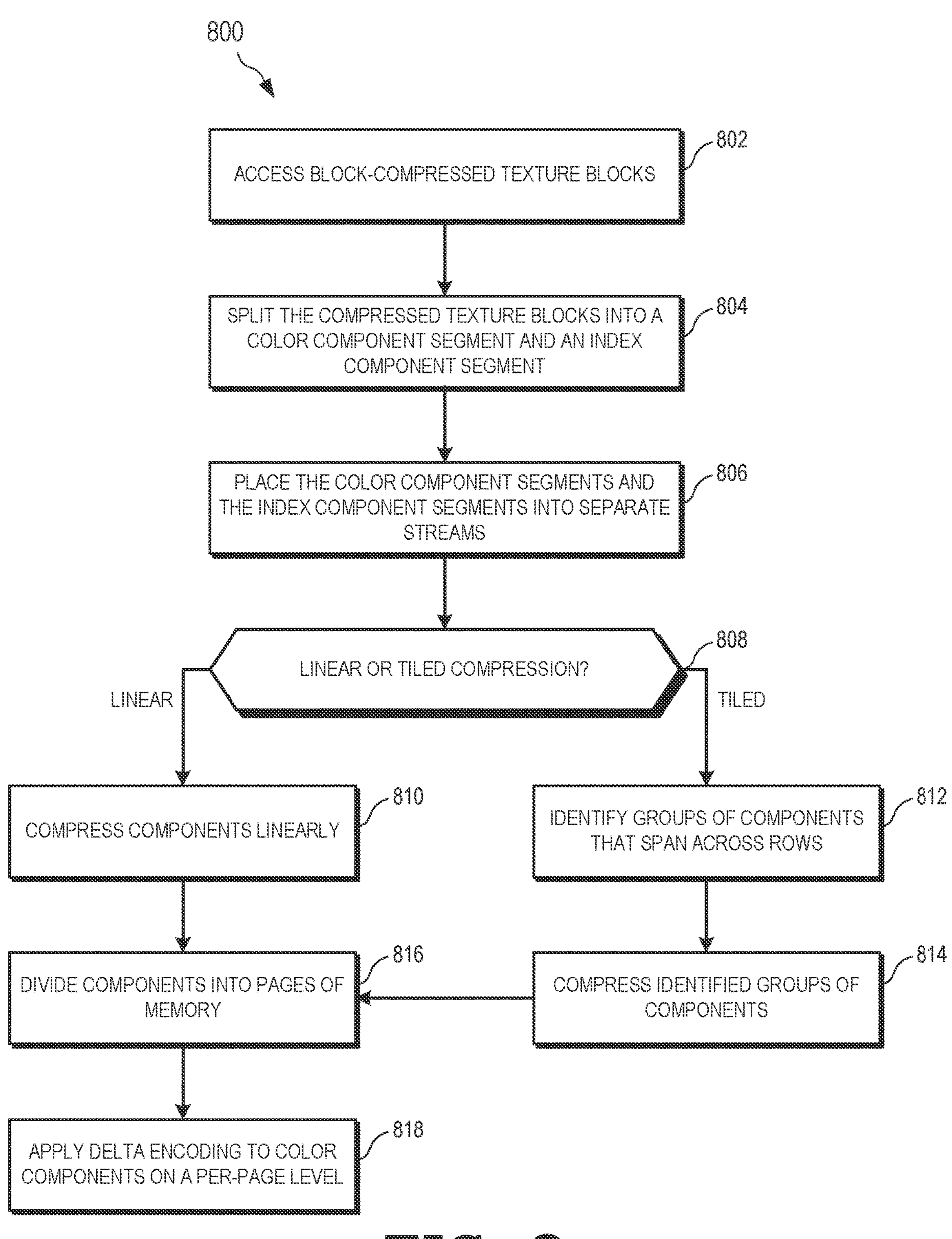
FIG. 8 is a flow diagram illustrating a method for preconditioning compressed data blocks by separately streaming color components and index components of the compressed texture blocks for lossless compression in accordance with some implementations.

FIG. 8 is a flow diagram illustrating a method 800 for preconditioning block-compressed data blocks by separately streaming color components and index components of the compressed texture blocks for lossless compression in accordance with some implementations. In some implementations, the method 800 is performed by the processing system 100 of FIG. 1.

At block 802, the preconditioning circuitry 160 accesses block-compressed texture blocks such as BCn blocks 206 that were compressed using a lossy block compression technique such as BC1 through BC7. Each BCn block 206 includes color components that specify color endpoints for the texture block and index components for interpolating a distance from the color endpoints for each pixel of the texture block.

At block 804, the preconditioning circuitry 160 divides each of the block-compressed texture blocks 206 into a color component segment such as color component segments 208 and an index component segment such as index component segments 210.

At block 806, the preconditioning circuitry 160 separately streams the color component segments 208 in a color components stream such as color components stream 320 and the index component segments 210 in an index components stream such as index components stream 322.

At block 808, depending on the implementation, the preconditioning circuitry 160 either applies linear or tiled compression. If, at block 808, the preconditioning circuitry 160 applies linear compression, the method flow continues to block 810. At block 810, the preconditioning circuitry 160 provides the color components stream 320 and the index components stream 322 for lossless compression at, e.g., the In some implementations, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

One or more of the elements described above is circuitry designed and configured to perform the corresponding operations described above. Such circuitry, in at least some implementations, is any one of, or a combination of, a hardcoded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry", etc.) are described or claimed as "configured" to perform one or more tasks or operations. This formulation—[entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:

dividing compressed texture blocks of a frame into a color component and an index component for each compressed texture block; and separately streaming color components and index components for a plurality of compressed texture blocks of the frame to a codec for lossless encoding.

2. The method of claim 1, wherein separately streaming comprises streaming the color components into a number of rows of color components and streaming the index components into a number of rows of index components.

3. The method of claim 2, further comprising:

grouping a plurality of color components and a plurality of index components for a plurality of adjacent compressed texture blocks of the frame into tiles.

4. The method of claim 3, wherein each tile comprises a first number of color components from each row of a second number of adjacent rows.

5. The method of claim 2, further comprising:

storing the rows of color components and the rows of index components at a page of memory.

6. The method of claim 5, further comprising:

applying delta encoding to encode differences between color components stored at the page of memory.

7. The method of claim 1, further comprising:

indicating in a header of the compressed texture block that the color component and the index component have been separately streamed to the codec.

8. The method of claim 1, further comprising:

losslessly encoding the color components and the index components of the compressed texture blocks to generate a plurality of commands comprising encoded tokens; and reordering the encoded tokens of the commands into a plurality of bitstreams for decoding at a corresponding plurality of threads at a parallel processor of a decoder.

9. A device, comprising:

preconditioning circuitry configured to:

divide compressed texture blocks of a frame into a color component and an index component for each compressed texture block; and separately stream color components and index components for a plurality of compressed texture blocks of the frame to a codec for lossless encoding.

10. The device of claim 9, wherein the preconditioning circuitry is further configured to:

stream the color components into a number of rows of color components and stream the index components into a number of rows of index components.

11. The device of claim 10, wherein the preconditioning circuitry is further configured to:

group a plurality of color components and a plurality of index components for a plurality of adjacent compressed texture blocks of the frame into tiles.

12. The device of claim 11, wherein each tile comprises a first number of color components from each row of a second number of adjacent rows.

13. The device of claim 10, wherein the preconditioning circuitry is further configured to:

store the rows of color components and the rows of index components at a page of memory.

14. The device of claim 13, further comprising:

lossless encoding circuitry configured to apply delta encoding to encode differences between color components stored at the page of memory.

15. The device of claim 9, wherein the preconditioning circuitry is further configured to:

indicate in a header of the compressed texture block that the color component and the index component have been separately streamed to the codec.

16. The device of claim 9, further comprising:

lossless encoding circuitry configured to:

losslessly encode the color components and the index components of the compressed texture blocks to generate a plurality of commands comprising encoded tokens; and reorder the encoded tokens of the commands into a plurality of bitstreams for decoding at a corresponding plurality of threads at a parallel processor of a decoder.

17. A device, comprising:

circuitry configured to:

receive a plurality of compressed texture blocks of a frame, each compressed texture block including a color component and an index component; and separately stream a plurality of color components and a plurality of index components for the plurality of compressed texture blocks for lossless encoding.

18. The device of claim 17, wherein the circuitry is further configured to:

group a plurality of color components for adjacent compressed texture blocks into a color component tile; and group a corresponding plurality of index components for the adjacent compressed texture blocks into an index component tile.

19. The device of claim 18, wherein the circuitry is further configured to:

partition a plurality of color component tiles and a plurality of index component tiles into a memory page.

20. The device of claim 19, wherein the circuitry is further configured to:

apply delta encoding to encode differences between color components stored at the memory page.

* * * * *